(12) United States Patent
Senshiki

(10) Patent No.: US 11,698,575 B2
(45) Date of Patent: Jul. 11, 2023

(54) PROJECTIVE TRANSFORMATION MATRIX DETERMINATION METHOD, PROJECTOR, AND DETERMINATION SYSTEM

(71) Applicant: SEIKO EPSON CORPORATION, Tokyo (JP)

(72) Inventor: Hiroki Senshiki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/516,782

(22) Filed: Nov. 2, 2021

(65) Prior Publication Data
US 2022/0137494 A1    May 5, 2022

(30) Foreign Application Priority Data
Nov. 2, 2020 (JP) .................... 2020-183521

(51) Int. Cl.
| | | |
|---|---|---|
| *G03B 21/14* | (2006.01) | |
| *H04N 9/31* | (2006.01) | |
| *G06T 7/73* | (2017.01) | |

(52) U.S. Cl.
CPC ......... *G03B 21/142* (2013.01); *G03B 21/147* (2013.01); *G06T 7/73* (2017.01); *H04N 9/3185* (2013.01)

(58) Field of Classification Search
CPC ........ G03B 21/147; G03B 21/14; G06T 7/73; H04N 9/3185; H04N 9/3179
See application file for complete search history.

(56) References Cited

U.S. PATENT DOCUMENTS

| | | |
|---|---|---|
| 2015/0146215 A1 | 5/2015 | Kobayashi et al. |
| 2015/0348313 A1 | 12/2015 | Fuchikami et al. |
| 2018/0316909 A1 | 11/2018 | Tsubaki |
| 2019/0297306 A1 | 9/2019 | Narikawa |
| 2020/0077061 A1* | 3/2020 | Ota ................ H04N 9/3185 |

FOREIGN PATENT DOCUMENTS

| | | |
|---|---|---|
| JP | 2010-271580 | 12/2010 |
| JP | 2010-283674 | 12/2010 |
| JP | 2012-249009 | 12/2012 |
| JP | 2015-021762 | 2/2015 |

(Continued)

*Primary Examiner* — Ryan D Howard
(74) *Attorney, Agent, or Firm* — Dority & Manning, P.A.

(57) ABSTRACT

A projective transformation matrix determination method includes receiving a change instruction to change a positional relationship among four feature points in a situation in which a projector projects a first projection image showing the four feature points onto a first area, causing the projector to project a second projection image showing the four feature points onto the first area in response to the change instruction, and determining a projective transformation matrix based on the coordinates of the four feature points in the second projection image and the coordinates of the four feature points in a first captured image generated by capturing, with a camera, an image of the first area where the second projection image is projected, the projective transformation matrix associating a projector coordinate system which defining the coordinates in an image projected by the projector with a camera coordinate system defining the coordinates in an image generated by the camera.

10 Claims, 7 Drawing Sheets

(56) References Cited

FOREIGN PATENT DOCUMENTS

| | | |
|---|---|---|
| JP | 2015-102423 | 6/2015 |
| JP | 2015-173430 | 10/2015 |
| JP | 2015-206753 | 11/2015 |
| JP | 2016-217833 | 12/2016 |
| JP | 2018-041169 | 3/2018 |
| JP | 2018-189443 | 11/2018 |
| JP | 2019-139030 | 8/2019 |
| JP | 2019-168546 | 10/2019 |

\* cited by examiner

PROJECTIVE TRANSFORMATION MATRIX DETERMINATION METHOD, PROJECTOR, AND DETERMINATION SYSTEM

The present application is based on, and claims priority from JP Application Serial Number 2020-183521, filed Nov. 2, 2020, the disclosure of which is hereby incorporated by reference herein in its entirety.

BACKGROUND

1. Technical Field

The present disclosure relates to a projective transformation matrix determination method, a projector, and a determination system.

2. Related Art

JP-A-2012-249009 discloses an approach for determining the projective transformation matrix. The projective transformation matrix described in JP-A-2012-249009 associates positions in a projection image projected from a projector onto a screen with positions in a captured image produced by a camera that captures an image of the screen on which the projection image is projected.

To determine the projective transformation matrix, it is necessary that the projection image has at least four feature points, and that for each of the feature points, the coordinates of the feature point in the projection image is associated with the coordinates of the feature point in the captured image. Furthermore, the feature points in the projection image need to be projected on the same planar display surface.

However, in a situation in which a projection image is projected on a single planar display surface, such as a wall, for the purpose of signage or any other purpose in a store or at any other location, and when a three-dimensional object, such as a statue, is present in front of the display surface, any of the feature points in the projection image may undesirably be projected on the three-dimensional object instead of being projected on the display surface. In this case, since the feature points in the projection image are not projected on the same planar display surface, a projective transformation matrix that associates positions in the projection image with positions in the captured image may undesirably not be determined.

SUMMARY

An aspect of a projective transformation matrix determination method according to the present disclosure includes receiving a change instruction in a situation in which a projector projects a first projection image showing four feature points onto a first area, the change instruction being an instruction to change a positional relationship among the four feature points, causing the projector to project a second projection image showing the four feature points onto the first area in response to the change instruction, and determining a projective transformation matrix based on coordinates of the four feature points in the second projection image and coordinates of the four feature points in a first captured image generated when a camera captures an image of the first area where the second projection image is projected, the projective transformation matrix associating a projector coordinate system defining coordinates in a projection image projected by the projector with a camera coordinate system defining coordinates in a captured image generated by the camera, and the positional relationship among the four feature points in the second projection image differs from the positional relationship among the four feature points in the first projection image.

An aspect of a projector according to the present disclosure includes a projection section that projects an image, a receipt section that receives a change instruction to change a positional relationship among four feature points in a situation in which the projection section projects a first projection image showing the four feature points onto a first area, a projection control section that causes the projection section to project a second projection image showing the four feature points onto the first area in response to the change instruction, and a determination section that determines a projective transformation matrix based on coordinates of the four feature points in the second projection image and coordinates of the four feature points in a first captured image generated when a camera captures an image of the first area where the second projection image is projected, the projective transformation matrix associating a projection coordinate system defining coordinates in a projection image projected by the projection section with a camera coordinate system defining coordinates in a captured image generated by the camera, and the positional relationship among the four feature points in the second projection image differs from the positional relationship among the four feature points in the first projection image.

An aspect of a determination system according to the present disclosure includes a projector that projects an image, a camera that performs imaging, and a control apparatus that controls the projector and the camera. The control apparatus include a receipt section that receives a change instruction to change a positional relationship among four feature points in a situation in which the projector projects a first projection image showing the four feature points onto a first area, a projection control section that causes the projector to project a second projection image showing the four feature points onto the first area in response to the change instruction, and a determination section that determines a projective transformation matrix based on coordinates of the four feature points in the second projection image and coordinates of the four feature points in a first captured image generated when the camera captures an image of the first area where the second projection image is projected, the projective transformation matrix associating a projector coordinate system defining coordinates in a projection image projected by the projector with a camera coordinate system defining coordinates in a captured image generated by the camera. The positional relationship among the four feature points in the second projection image differs from the positional relationship among the four feature points in the first projection image.

DESCRIPTION OF EXEMPLARY EMBODIMENTS

A. First Embodiment

A1: Determination System 1

Figure 1:
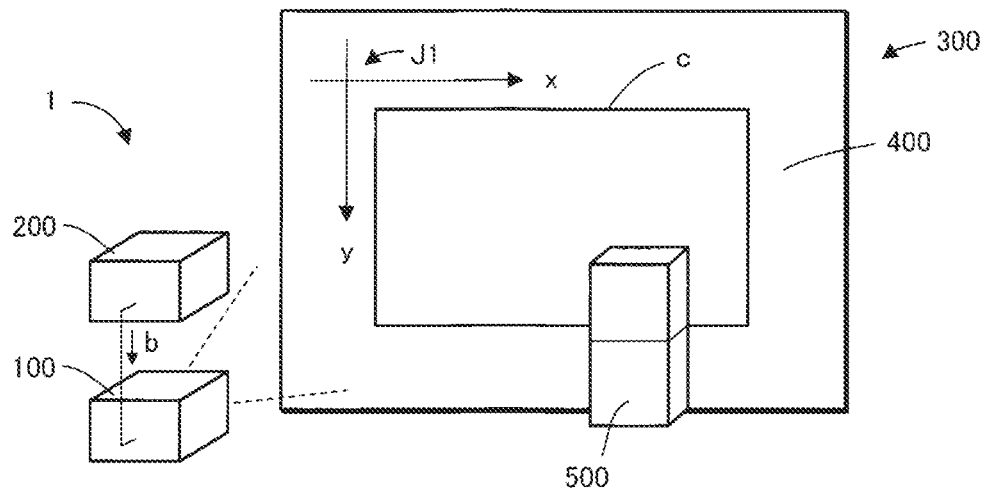
FIG. 1 shows a determination system according to a first embodiment.

FIG. 1 shows a determination system 1 according to a first embodiment. The determination system 1 includes a projector 100 and a camera 200.

The projector 100 projects a projection image c onto a projection receiving object 300. A projector coordinate system J1 is applied to the projection image c. The projector coordinate system J1 shows the coordinates in the projection image c. The projector coordinate system J1 is an example of a projection coordinate system.

The projection receiving object 300 includes a planar display surface 400 and a three-dimensional object 500. The display surface 400 is a wall. The display surface 400 is not limited to a wall and may instead, for example, be a screen, a table deck, a floor, a ceiling, a whiteboard, or a door. The three-dimensional object 500 is a statue. The three-dimensional object 500 is not limited to a statue and may, for example, be a doll, a pillar, or a shelf. The area where the projection image c is projected on the projection receiving object 300 is an example of a first area.

The camera 200 generates a captured image by capturing an image of an area including the area where the projection image c is projected on the projection receiving object 300. A camera coordinate system J2 is applied to the captured image. The camera coordinate system J2 shows the coordinates in the captured image. The camera 200 generates captured image data b representing the captured image. The camera 200 provides the projector 100 with the captured image by providing the projector 100 with the captured image data b.

The projector 100 determines a projective transformation matrix H, which associates the projector coordinate system J1 with the camera coordinate system J2 by using the projection image c and the captured image.

A2: Projection Image c

Figure 2:
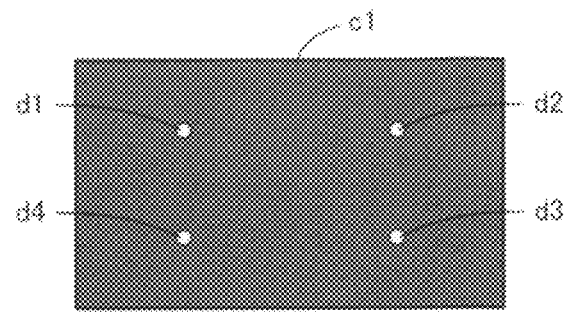
FIG. 2 shows a first projection image that is an example of a projection image.

FIG. 2 shows a first projection image c1, which is an example of the projection image c. The first projection image c1 shows four white dots d1 to d4 present on a black background. The positional relationship among the dots d1 to d4 in the first projection image c1 is an example of a first positional relationship.

In the first projection image c1, the color of the background is not limited to black and only needs to be a color different from the color of the dots d1 to d4. The color of the dots d1 to d4 is not limited to white and only needs to be a color different from the color of the background. The positional relationship among the four dots d1 to d4 in the first projection image c1 is not limited to the positional relationship shown in FIG. 2 and can be changed as appropriate. The dots d1 to d4 are each an example of a feature point. The feature point is not limited to a dot and may instead, for example, be a x mark, a polygon, an oval, the intersection of a plurality of lines, or the intersection of a plurality of shapes. The number of feature points is not limited to four and may be five or more. The four dots d1 to d4 are an example of four feature points, furthermore, an example of at least four feature points.

Figure 3:
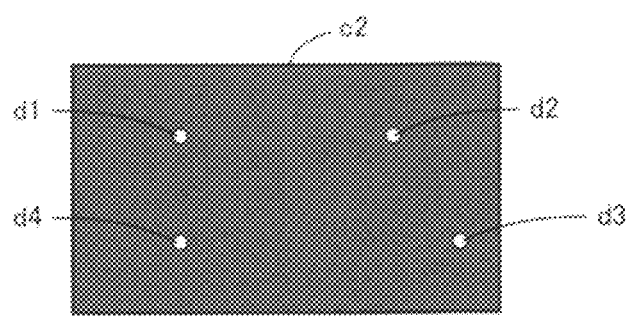
FIG. 3 shows a second projection image that is another example of the projection image.

FIG. 3 shows a second projection image c2, which is another example of the projection image c. The second projection image c2 shows the four white dots d1 to d4 present on the black background, as the first projection image c1 does. The positional relationship among the dots d1 to d4 in the second projection image c2 is an example of a second positional relationship.

In the second projection image c2, the color of the background is not limited to black and only needs to be a color different from the color of the dots d1 to d4. In the second projection image c2, the color of the dots d1 to d4 is not limited to white and only needs to be a color different from the color of the background. The number of dots shown in the second projection image c2 is equal to the number of dots shown in the first projection image c1.

The positional relationship among the four dots d1 to d4 in the second projection image c2 differs from the positional relationship among the four dots d1 to d4 in the first projection image c1. Different positional relationships among the four dots d1 to d4 mean that the positions of one or more of the four dots d1 to d4 differ between the first projection image c1 and the second projection image c2. For example, the state in which only the position of the dot d3 out of the four dots d1 to d4 differs between the first projection image c1 and the second projection image c2, as shown in FIGS. 2 and 3, is referred to as the state in which the positional relationship among the four dots d1 to d4 in the second projection image c2 differs from the positional relationship among the four dots d1 to d4 in the first projection image c1. The positional relationship among the four dots d1 to d4 in the second projection image c2 is not limited to the positional relationship shown in FIG. 3 and can be changed as appropriate as long as the positional relationship differs from the positional relationship among the four dots d1 to d4 in the first projection image c1.

The projector 100 can project the first projection image c1 and the second projection image c2 separately on the projection receiving object 300.

A3: Projector 100 and Camera 200

Figure 4:
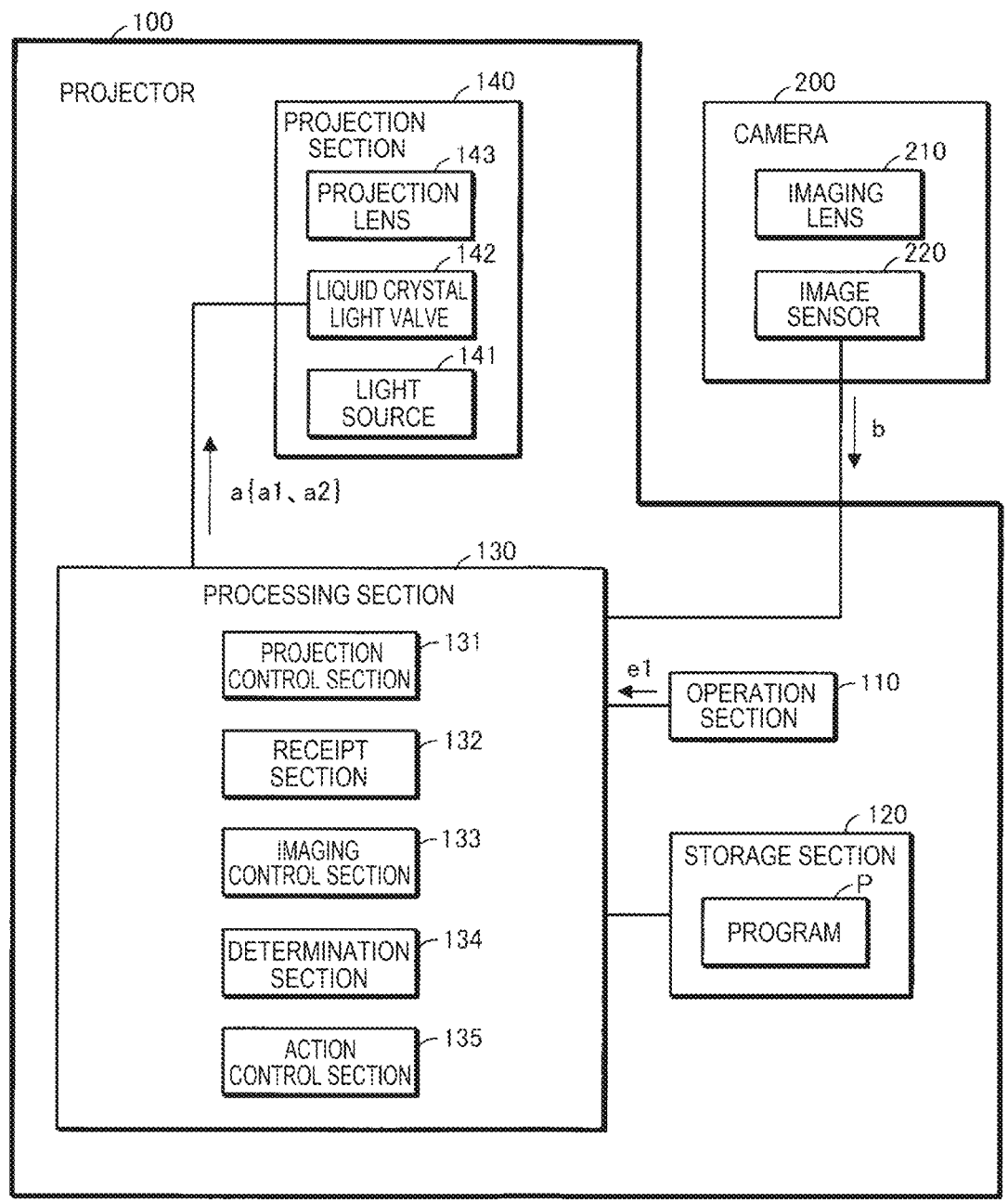
FIG. 4 shows an example of a projector and an example of a camera.

FIG. 4 shows an example of the projector 100 and an example of the camera 200. The projector 100 includes an operation section 110, a storage section 120, a processing section 130, and a projection section 140.

The operation section 110 includes at least one of operation buttons and a touch panel. A user inputs a variety of instructions to the operation section 110 by operating the operation section 110. The operation section 110 receives instructions inputted from the user. The operation section 110 may receive instructions from the user via a remote control that is not shown. The operation section 110 is an example of an instruction input section.

The storage section 120 is a recording medium readable by the processing section 130. The storage section 120 includes, for example, a nonvolatile memory and a volatile memory. The nonvolatile memory is, for example, a ROM (read only memory), an EPROM (erasable programmable read only memory), and an EEPROM (electrically erasable programmable read only memory). The volatile memory is, for example, a RAM (random access memory).

The storage section 120 stores a program P executed by the processing section 130 and a variety of data used by the processing section 130.

The processing section 130 is formed, for example, of one or more CPUs (central processing units). The one or more CPUs are an example of one or more processors. The processors and the CPUs are each an example of a computer.

The processing section 130 reads the program P from the storage section 120. The processing section 130 executes the program P to achieve a variety of functions. For example, the processing section 130 provides the projection section 140 with image data a representing the projection image c to cause the projection section 140 to project the projection image. The image data a is expressed in voltage. The processing section 130 receives the captured image, furthermore, the captured image data b, from the camera 200. The processing section 130 uses the projection image c and the captured image to determine the projective transformation matrix H, which associates the projector coordinate system J1 with the camera coordinate system J2.

Part or entirety of the functions of the processing section 130 may be achieved by a circuit, such as a DSP (digital signal processor), an ASIC (application specific integrated circuit), a PLD (programmable logic device), and an FPGA (field programmable gate array).

The processing section 130 is an example of a control apparatus.

The projection section 140 projects the projection image c onto the projection receiving object 300. The projection section 140 includes a light source 141, a liquid crystal light valve 142, and a projection lens 143.

The light source 141 is an LED (light emitting diode). The light source 141 is not limited to an LED and may, for example, be a xenon lamp, an ultrahigh-pressure mercury lamp, or a laser light source.

Figure 5:
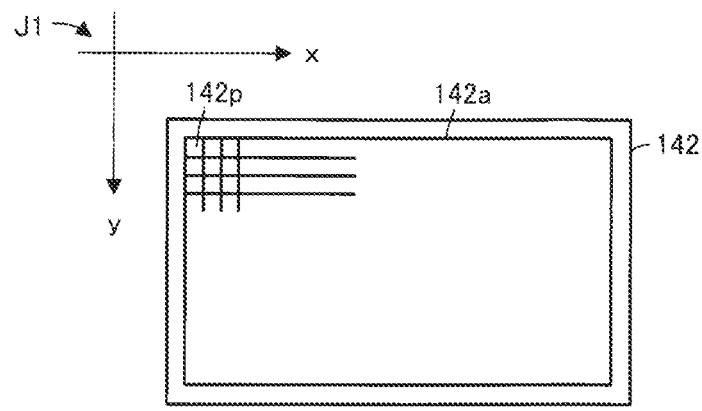
FIG. 5 shows an example of a liquid crystal light valve.

The liquid crystal light valve 142 is formed, for example, of a liquid crystal panel in which a liquid crystal material is present between a pair of transparent substrates. The liquid crystal light valve 142 has a rectangular pixel area 142a, as shown in FIG. 5. The pixel area 142a includes a plurality of pixels 142p arranged in a matrix.

The projector coordinate system J1 is applied to the liquid crystal light valve 142. The projector coordinate system J1 is defined by axes x and y.

The axes x and y are determined in accordance with the orientation of the liquid crystal light valve 142. The axis x is parallel to the horizontal direction of the liquid crystal light valve 142, that is, parallel to the lateral direction of the liquid crystal light valve 142. The axis y is perpendicular to the axis x. The axis y is parallel to the vertical direction of the liquid crystal light valve 142, that is, parallel to the longitudinal direction of the liquid crystal light valve 142.

In the liquid crystal light valve 142, voltages representing the image data a are applied to the liquid crystal material for each of the pixels 142p. The optical transmittance of each of the pixels 142p is set based on the image data a.

In FIG. 4, the light outputted from the light source 141 is modulated at the pixel area 142a of the liquid crystal light valve 142. The liquid crystal light valve 142 is an example of a light modulator. The light modulated by the liquid crystal light valve 142 travels toward the projection lens 143. The projection lens 143 projects the light modulated by the liquid crystal light valve 142, that is, the projection image c onto the projection receiving object 300.

A configuration including at least the projection section 140, for example, a configuration in which the operation section 110, the storage section 120, and the processing section 130 are removed from the projector 100 functions as a projector. The projection section 140 can therefore also be referred to as a projector.

The camera 200 is a component separate from the projector 100. The camera 200 may instead be built in the projector 100. The camera 200 includes an imaging lens 210 and an image sensor 220.

The imaging lens 210 brings an optical image containing the projection image c on the projection receiving object 300 into focus on the image sensor 220. The optical image containing the projection image c is the captured image.

Figure 6:
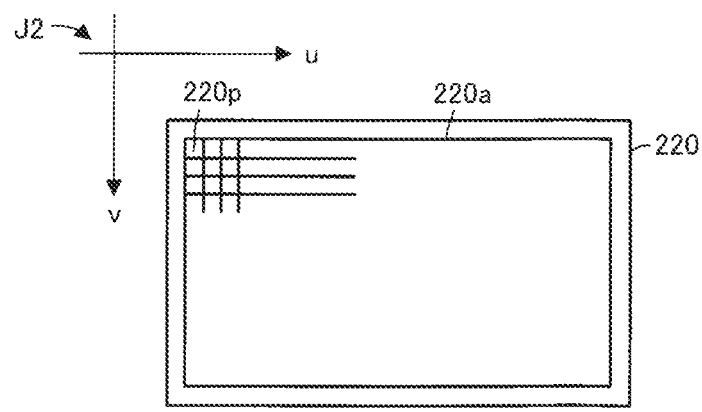
FIG. 6 shows an example of an image sensor.

The image sensor 220 is a CCD (charge coupled device) image sensor. The image sensor 220 is not limited to a CCD image sensor and may instead, for example, be a CMOS (complementary metal oxide semiconductor) image sensor. The image sensor 220 generates the captured image data b representing the captured image based on the optical image brought into focus by the imaging lens 210. The image sensor 220 has a rectangular imaging area 220a, as shown in FIG. 6. The imaging area 220a includes a plurality of light receiving cells 220p arranged in a matrix.

The camera coordinate system J2 is applied to the image sensor 220. The camera coordinate system J2 is defined by axes u and v.

The axes u and v are determined in accordance with the orientation of the image sensor 220. The axis u is parallel to the horizontal direction of the image sensor 220, that is, parallel to the lateral direction of the image sensor 220. The axis v is perpendicular to the axis u. The axis v is parallel to the vertical direction of the image sensor 220, that is, parallel to the longitudinal direction of the image sensor 220.

A4: Example of Processing Section 130

In FIG. 4, the processing section 130 functions as a projection control section 131, a receipt section 132, an imaging control section 133, a determination section 134, and an action control section 135 by executing the program P. The action control section 135 may be omitted.

The projection control section 131 controls the projection section 140. The projection control section 131 causes the projection section 140 to project the projection image c onto the projection receiving object 300. The projection control section 131 provides the projection section 140 with the image data a representing the projection image c to cause the projection section 140 to project the projection image c onto the projection receiving object 300. For example, the projection control section 131 provides the projection section 140 with image data a1 representing the first projection image c1 to cause the projection section 140 to project the first projection image c1 onto the projection receiving object 300. Furthermore, the projection control section 131 provides the projection section 140 with image data a2 representing the second projection image c2 to cause the projection section 140 to project the second projection image c2 onto the projection receiving object 300.

The receipt section 132 receives a variety of instructions from the operation section 110. For example, the receipt section 132 receives a change instruction e1 to change the positional relationship among the dots d1 to d4 in the situation in which the projection section 140 projects the first projection image c1 on the projection receiving object 300. For example, the change instruction e1 is an instruction to change the positional relationship among the dots d1 to d4 in the first projection image c1 from the first positional relationship to the second positional relationship.

When the receipt section 132 receives the change instruction e1 in the situation in which the projection section 140 projects the first projection image c1 on the projection receiving object 300, the projection control section 131 causes the projection section 140 to project the second projection image c2 onto the projection receiving object 300 in place of the first projection image c1 in accordance with the change instruction e1. When the receipt section 132 receives the change instruction e1 in the situation in which the projection section 140 projects the second projection image c2 on the projection receiving object 300, the projection control section 131 causes the projection section 140 to project the first projection image c1 onto the projection receiving object 300 in place of the second projection image c2 in accordance with the change instruction e1.

Figure 7:
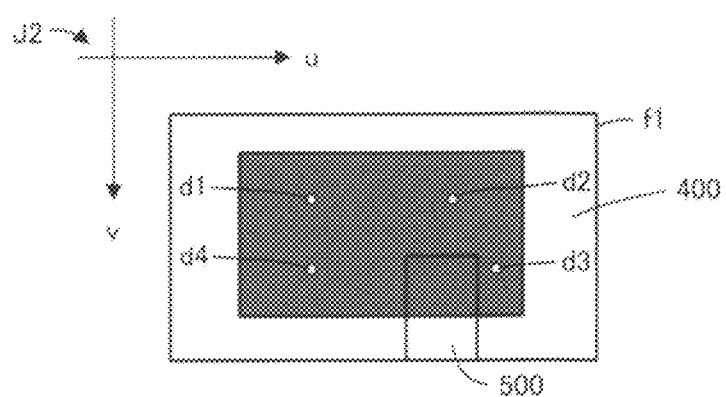
FIG. 7 shows an example of a captured image.

The imaging control section 133 controls the camera 200. The imaging control section 133 causes the camera 200 to generate the captured image by causing the camera 200 to capture an image of the projection image c projected on the projection receiving object 300. For example, the imaging control section 133 causes the camera 200 to capture an image of an area containing the area where the second projection image c2 is projected on the projection receiving object 300 to cause the camera 200 to generate a captured image f1. The captured image f1 is an example of the first captured image. FIG. 7 shows an example of the captured image f1. The captured image f1 shown in FIG. 7 shows a state in which none of the dots d1 to d4 is projected onto the three-dimensional object 500 but onto the display surface 400.

In FIG. 4, the determination section 134 determines the projective transformation matrix H based on the coordinates of the dots d1 to d4 in the second projection image c2 and the coordinates of the dots d1 to d4 in the captured image f1.

The action control section 135 controls the action of the projector 100 by using the projective transformation matrix H. For example, when the captured image shows an pointing element that points at the display surface 400, such as a finger, the action control section 135 converts the coordinates of the pointing element in the camera coordinate system J2 into the coordinates of the pointing element in the projector coordinate system J1 by using the projective transformation matrix H. The action control section 135 subsequently generates image data representing an image containing a picture that is a line or any other object at the coordinates of the pointing element in the projector coordinate system J1. The projection control section 131 provides the projection section 140 with the image data generated by the action control section 135 to cause the projection section 140 to project the image containing the picture that is a line or any other object at the coordinates of the pointing element in the projector coordinate system J1.

A5: Projective Transformation Matrix H

The projective transformation matrix H is identified based on eight coefficients. The determination section 134 therefore determines the projective transformation matrix H by identifying the eight coefficients. A description will be made of the determination process.

Coordinates (x, y) in a plane that are defined by the projector coordinate system J1 and coordinates (u, v) produced by projection conversion of the coordinates (x, y) into coordinates in a plane that are defined by the camera coordinate system J2 are related to each other by Expressions 1 and 2 below.

$$u = \frac{\alpha_{1}x + \beta_{1}y + \gamma_{1}}{\alpha_{0}x + \beta_{0}y + \gamma_{0}}$$  Expression 1

$$v = \frac{\alpha_{2}x + \beta_{2}y + \gamma_{2}}{\alpha_{0}x + \beta_{0}y + \gamma_{0}}$$  Expression 2

Expressions 1 and 2 have nine coefficients $\alpha_0$, $\alpha_1$, $\alpha_2$, $\beta_0$, $\beta_1$, $\beta_2$, $\gamma_0$, $\gamma_1$, and $\gamma_2$. However, since Expressions 1 and 2 are both fractions, one of the nine coefficients can be determined to be an arbitrary value. The number of independent unknown coefficients is therefore eight. The projective transformation matrix H can therefore be identified based on the eight independent unknown coefficients.

The determination section 134 generates simultaneous equations with eight unknowns by substituting the coordinates of the dots d1 to d4 in the projector coordinate system J1 and the coordinates of the dots d1 to d4 in the camera coordinate system J2 into Expressions 1 and 2. The determination section 134 determines the eight independent unknown coefficients by solving the simultaneous equations with eight unknowns. Based on the eight determined coefficients, the determination section 134 determines the projective transformation matrix H, in accordance with which the coordinates (x, y) in the projector coordinate system J1 undergoes projection conversion into the coordinates (u, v) in the camera coordinate system J2.

The determination section 134 determines based on the projective transformation matrix H, a projective transformation matrix $H^{-1}$ in accordance with which the coordinates (u, v) in the camera coordinate system J2 undergoes projection conversion into the coordinates (x, y) in the projector coordinate system J1. The action control section 135 converts the coordinates of the pointing element in the camera coordinate system J2 into the coordinates of the pointing element in the projector coordinate system J1 by using the projective transformation matrix $H^{-1}$ determined based on the projective transformation matrix H.

The determination section 134 may determine the projective transformation matrix $H^{-1}$ before determining the projective transformation matrix H. In this case, the determination section 134 determines the projective transformation matrix H based on the projective transformation matrix $H^{-1}$.

The projective transformation matrix H and the projective transformation matrix $H^{-1}$ are each a projective transformation matrix that associates the projector coordinate system J1 and the camera coordinate system J2 with each other.

Expressions 1 and 2 used to determine the projective transformation matrix H show the relationship between the coordinates (x, y) in a plane that are defined by the projector coordinate system J1 and the coordinates (u, v) produced by the projection conversion of the coordinates (x, y) into the coordinates in a plane that are defined by the camera coordinate system J2. Therefore, when the determination section 134 determines the projective transformation matrix H by using Expressions 1 and 2, the coordinates of the dots d1 to d4 in the projector coordinate system J1 need to be present in the same plane and the coordinates of the dots d1 to d4 in the camera coordinate system J2 need to be present in the same plane.

The coordinates of the dots d1 to d4 in the projector coordinate system J1 are present in the same plane because the coordinates are present in the projection image c. The coordinates of the dots d1 to d4 in the camera coordinate system J2 are present in the same plane when the four dots d1 to d4 in the projection image c are all projected on the planar display surface 400. When some of the four dots d1 to d4 in the projection image c are projected on the planar display surface 400, and the remainder of the four dots d1 to d4 in the projection image c are projected on the three-dimensional object 500, the coordinates of the dots d1 to d4 in the camera coordinate system J2 are not present in the same plane. Therefore, when some of the four dots d1 to d4 in the projection image c are projected on the planar display surface 400, and the remainder of the four dots d1 to d4 in the projection image c are projected on the three-dimensional object 500, it is difficult to determine an effective projective transformation matrix H.

In the present embodiment, when some of the four dots d1 to d4 in the first projection image c1 are projected on the planar display surface 400, and the remainder of the four dots d1 to d4 in the first projection image c1 are projected on the three-dimensional object 500, the first projection image c1 can be changed to the second projection image c2, in which the positional relationship among the four dots d1 to d4 differs from that in the first projection image c1, in accordance with the change instruction e1. A situation in which the four dots d1 to d4 in the projection image c are all projected on the planar display surface 400 can therefore be likely to be created as compared with a configuration in which the first projection image c1 is not switchable to another.

A6: Description of Action

Figure 8:
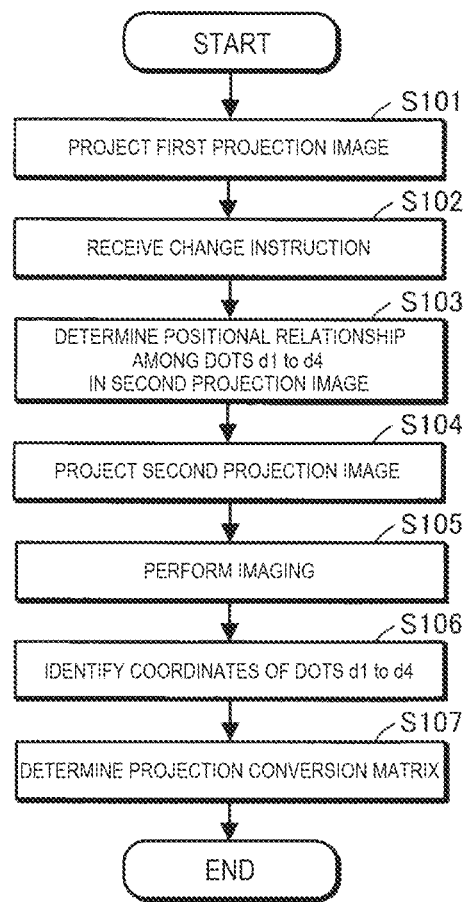
FIG. 8 describes the action of the determination system.

FIG. 8 describes the action of the determination system 1. The user inputs a start instruction to the operation section 110 by operating the operation section 110. Upon receipt of the start instruction, the operation section 110 provides the processing section 130 with the start instruction.

When the processing section 130 receives the start instruction, the projection control section 131 causes the projection section 140 to project the first projection image c1 onto the projection receiving object 300 in step S101.

In step S101, the projection control section 131 provides the projection section 140 with the image data a1 representing the first projection image c1. When the image data a1 is stored in the storage section 120, the projection control section 131 reads the image data a1 from the storage section 120. The projection control section 131 provides the projection section 140 with the image data A1 read from the storage section 120. The projection control section 131 may generate the image data a1 based on the program P. In this case, the projection control section 131 provides the projection section 140 with the generated image data a1. Upon receipt of the image data a1, the projection section 140 projects the first projection image c1 indicated by the image data a1 onto the projection receiving object 300.

Figure 9:
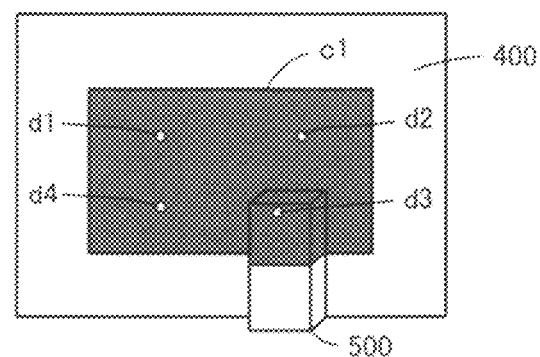
FIG. 9 shows an example of projection of the first projection image.

In this process, when only the dot d3 of the four dots d1 to d4 shown in the first projection image c1 is projected on the three-dimensional object 500 instead of the display surface 400, as shown in FIG. 9, the determination section 134 cannot determine an effective projective transformation matrix H.

In this case, the user inputs the change instruction e1, which changes the positional relationship among the dots d1 to d4, to the operation section 110 by operating the operation section 110. The change instruction e1 is, for example, an instruction to change the position of at least one of the four dots d1 to d4 in the first projection image c1 projected on the three-dimensional object 500. At least one of the four dots d1 to d4 in the first projection image c1 is, for example, the dot d3.

Figure 10:
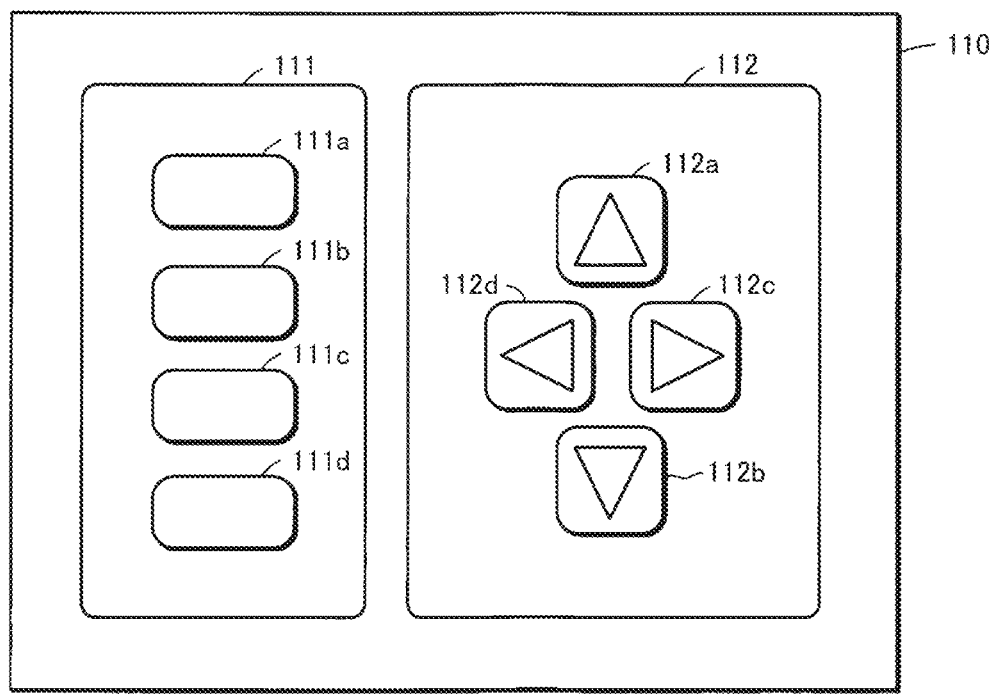
FIG. 10 shows an example of an operation section.

A description will be made of an example of input of the change instruction e1 when the operation section 110 has selection buttons 111 and direction buttons 112, as shown in FIG. 10.

In this case, the change instruction e1 includes a selection instruction to select a dot, a direction instruction to specify the direction in which the dot is moved, and a distance instruction to specify the distance by which the dot is moved. The selection buttons 111 are used to input the selection instruction. The direction buttons 112 are used to input the direction instruction and the distance instruction.

The selection buttons 111 include a first selection button 111a corresponding to the dot d1, a second selection button 111b corresponding to the dot d2, a third selection button 111c corresponding to the dot d3, and a fourth selection button 111d corresponding to the dot d4.

Pressing the first selection button 111a is the operation of inputting a selection instruction to select the dot d1. The pressing is an example of operation. Pressing the second selection button 111b is the operation of inputting a selection instruction to select the dot d2. Pressing the third selection button 111c is the operation of inputting a selection instruction to select the dot d3. Pressing the fourth selection button 111d is the operation of inputting a selection instruction to select the dot d4.

The direction buttons 112 include an upward button 112a corresponding to the upward direction, a downward button 112b corresponding to the downward direction, a rightward button 112c corresponding to the rightward direction, and a leftward button 112d corresponding to the leftward direction.

Pressing the upward button 112a is the operation of inputting a direction instruction that specifies upward movement of the dot. Pressing the downward button 112b is the operation of inputting a direction instruction that specifies downward movement of the dot. Pressing the rightward button 112c is the operation of inputting a direction instruction that specifies rightward movement of the dot. Pressing the leftward button 112d is the operation of inputting a direction instruction that specifies leftward movement of the dot.

The operation of pressing any of the upward button 112a, the downward button 112b, the rightward button 112c, and the leftward button 112d once is operation of inputting a distance instruction that specifies a movement distance corresponding to five pixels of the liquid crystal light valve 142. The five pixels are an example of a predetermined number of pixels. The predetermined number is not limited to five and may instead be greater than or equal to six or greater than or equal to one but smaller than five.

To move the position of the dot d3 projected on the three-dimensional object 500 as shown in FIG. 9 to a right area located to the right of the three-dimensional object 500 and on the display surface 400 as shown in FIG. 7, the user first inputs the selection instruction to select the dot d3 to the operation panel 110 by pressing the third selection button 111c.

The user subsequently inputs the direction instruction to specify the rightward movement of the dot and the distance instruction to specify the distance by which the dot is moved to the right area to the operation section 110 by pressing the rightward button 112c one or more times.

Upon receipt of the change instruction e1 including the selection instruction, the direction instruction, and the distance instruction from the user, the operation section 110 provides the processing section 130 with the change instruction e1.

Subsequently, in step S102, the receipt section 132 of the processing section 130 receives the change instruction e1 from the operation section 110.

When the receipt section 132 receives the change instruction e1, the projection control section 131 determines the positional relationship among the four dots d1 to d4 in the second projection image c2 by changing the positional relationship among the four dots d1 to d4 in the first projection image c1 in accordance with the change instruction e1 in step S103.

For example, the projection control section 131 moves only the coordinates of the dot d3 out of the coordinates of the dots d1 to d4 in the first projection image c1 on the liquid crystal light valve 142 by the distance indicated by the distance instruction in the right direction in the projector coordinate system J1, that is, the direction in which the value of the x coordinate increases out of the directions parallel to the axis x. The projection control section 131 determines the positional relationship among the four dots d1 to d4 in the second projection image c2 by moving the coordinates of the dot d3.

Subsequently, in step S104, the projection control section 131 causes the projection section 140 to project the second projection image c2 showing the four dots d1 to d4 having the positional relationship determined in step S103 onto the projection receiving object 300.

In step S104, the projection control section 131 first generates the image data a2 representing the second projection image c2. The projection control section 131 subsequently provides the projection section 140 with the image data a2. Upon receipt of the image data a2, the projection section 140 projects the second projection image c2 indicated by the image data a2 onto the projection receiving object 300.

When the user ascertains that the four dots d1 to d4 in the second projection image c2 are all projected on the display surface 400, the user inputs an imaging instruction to the operation section 110 by operating the operation section 110. Upon receipt of the imaging instruction, the operation section 110 provides the processing section 130 with the imaging instruction.

When the processing section 130 receives the imaging instruction, the imaging control section 133 causes the camera 200 to capture an image of an area containing the area where the second projection image c2 is projected on the projection receiving object 300 to generate the captured image f1 in step S105. The camera 200 provides the processing section 130 with the captured image data b representing the captured image f1.

Subsequently, in step S106, the determination section 134 identifies the coordinates, in the projector coordinate system J1, of the dots d1 to d4 shown in the second projection image c2 and the coordinates, in the camera coordinate system J2, of the dots d1 to d4 shown in the captured image f1.

For example, the determination section 134 identifies the coordinates, in the projector coordinate system J1, of the dots d1 to d4 shown in the second projection image c2 by analyzing the image data a2 representing the second projection image c2. The determination section 134 identifies the coordinates, in the camera coordinate system J2, of the dots d1 to d4 shown in the captured image f1 by analyzing the captured image data b representing the captured image f1.

Subsequently, in step S107, the determination section 134 determines the projective transformation matrix H based on the coordinates, in the projector coordinate system J1, of the dots d1 to d4 shown in the second projection image c2 and the coordinates, in the camera coordinate system J2, of the dots d1 to d4 shown in the captured image f1.

For example, the determination section 134 generates simultaneous equations with eight unknowns by substituting the coordinates, in the projector coordinate system J1, of the dots d1 to d4 shown in the second projection image c2 and the coordinates, in the camera coordinate system J2, of the dots d1 to d4 shown in the captured image f1 into Expressions 1 and 2 described above. The determination section 134 determines the eight independent unknown coefficients by solving the simultaneous equations with eight unknowns. Based on the eight determined coefficients, the determination section 134 determines the projective transformation matrix H, in accordance with which the coordinates in the projector coordinate system J1 undergoes projective transformation into the coordinates in the camera coordinate system J2.

The determination section 134 may determine the projective transformation matrix $H^{-1}$ in place of the projective transformation matrix H by using Expressions 1 and 2 described above.

For example, when the user inputs the imaging instruction to the operation section 110 in the situation in which the dots d1 to d4 in the first projection image c1 are all projected on the display surface 400, the following actions are performed. Steps S102 to S104 are omitted. In step S106, the determination section 134 identifies the coordinates, in the projector coordinate system J1, of the dots d1 to d4 shown in the first projection image c1 and the coordinates, in the camera coordinate system J2, of the dots d1 to d4 shown in the captured image representing the first projection image c1. In step S107, the determination section 134 determines the projective transformation matrix H based on the coordinates, in the projector coordinate system J1, of the dots d1 to d4 shown in the first projection image c1 and the coordinates, in the camera coordinate system J2, of the dots d1 to d4 shown in the captured image representing the first projection image c1.

A7: Overview of First Embodiment

In response to the change instruction e1, the projection control section 131 causes the projection section 140 to project the second projection image c2 in place of the first projection image c1 onto the projection receiving object 300. The positional relationship among the dots d1 to d4 in the second projection image c2 differs from the positional relationship among the dots d1 to d4 in the first projection image c1. Therefore, even when any of the dots d1 to d4 in the first projection image c1 is not projected on the display surface 400, the dots d1 to d4 in the second projection image c2 may all be projected on the display surface 400. The determination section 134 determines the projective transformation matrix H based on the coordinates, in the projector coordinate system J1, of the dots d1 to d4 shown in the second projection image c2 and the coordinates, in the camera coordinate system J2, of the dots d1 to d4 shown in the captured image f1. Therefore, even when any of the dots d1 to d4 in the first projection image c1 is not projected on the display surface 400, the determination section 134 can determine an effective projective transformation matrix H.

When an instruction to change the position of at least one of the four dots d1 to d4 in the first projection image c1 is used as the change instruction e1, the user can issue an intuitively recognizable instruction to change the position of a dot that is not located in a plane different from the plane where the other dots are present to a position in the plane where the other dots are present.

The determination section 134 determines the positional relationship among the four dots d1 to d4 in the second projection image c2 by changing the positional relationship among the four dots d1 to d4 in the first projection image c1 in response to the change instruction e1. The positional relationship among the four dots d1 to d4 in the second projection image c2 can therefore be determined to be a positional relationship intended by the user.

The receipt section 132 receives the change instruction e1 via the operation section 110, to which instructions are inputted by the user. The user can therefore change the positional relationship among the four dots d1 to d4 by inputting the change instruction e1 to the operation section 110.

B: Variations

Aspects of variations of the embodiment presented above by way of example will be presented below by way of example. Two or more aspects arbitrarily selected from those presented below by way of example may be combined with each other as appropriate to the extent that the aspects to be combined with each other do not contradict each other.

B1: First Variation

In the first embodiment, the operation section 110 is not necessarily formed of the selection buttons 111 and the direction buttons 112 but can be changed as appropriate.

In place of the selection buttons 111, the operation section 110 may include a selection switch that has the same functions as those of the selection buttons 111. In place of the direction buttons 112, the operation section 110 may include a direction switch that has the same functions as those of the direction buttons 112.

The operation section 110 may include a touch panel that uses a graphical user interface (GUI) to achieve the selection buttons 111 and the direction buttons 112. In this case, the physical selection buttons 111 and direction buttons 112 may be omitted.

The operation section 110 may include a touch panel that shows neither the selection buttons 111 nor the direction buttons 112. In this case, the touch panel of the operation section 110 displays the first projection image c1. The user inputs the change instruction e1, which indicates positions where the dots d1 to d4 should be displayed in the second projection image c2, to the operation section 110 by touching positions in the first projection image c1 displayed by the touch panel that are the positions where the dots d1 to d4 should be displayed in the second projection image c2. The operation section 110 provides the processing section 130 with the change instruction e1. The receipt section 132 receives the change instruction e1 from the operation section 110.

When the operation section 110 includes a touch panel that displays the first projection image c1, the user may by flick the touch panel to drag a dot in the first projection image c1 on the touch panel to a position where the dot should be displayed in the second projection image c2 and drop the dot at the position. The flicking operation performed by the user inputs the change instruction e1 to change the original position of the dragged dot to the position where the dot is dropped to the operation section 110. The operation section 110 provides the processing section 130 with the change instruction e1. The receipt section 132 receives the change instruction e1 from the operation section 110.

The operation section 110 may include a microphone and a voice recognition section. The voice recognition section is, for example, a processor having a voice recognition function or a dedicated circuit having a voice recognition function.

In this case, the user first selects a dot to be changed from the dots d1 to d4. The user subsequently inputs the name of the dot to be changed in the form of voice to the microphone. It is assumed that the name of each of the dots d1 to d4 is shown, for example, in the first projection image c1.

The user subsequently inputs any of the upward, downward, rightward, and leftward directions as the direction in which the dot is changed in the form of voice to the microphone. A single utterance representing any of the upward, downward, rightward, and leftward directions means the movement distance corresponding to a specific number of pixels of the liquid crystal light valve 142. The specific number of pixels is, for example, five pixels. The specific number is not limited to five and may instead be greater than or equal to six or smaller than five. The voice recognition section converts the voice inputted to the microphone into a character string.

The change instruction e1 to move the position of the dot to be changed by the number of pixels corresponding to the number of utterances in the direction in which the dot is changed, that is, in any of the upward, downward, rightward, and leftward directions is inputted to the operation section 110 in the form of voice inputted by the user. The operation section 110 provides the processing section 130 with the change instruction e1. The receipt section 132 receives the change instruction e1 from the operation section 110.

The operation section 110 may include a camera and a gesture recognition section. The gesture recognition section is, for example, a processor having a gesture recognition function or a dedicated circuit having a gesture recognition function.

In this case, the user first selects a dot to be changed from the dots d1 to d4. The user subsequently makes a gesture corresponding to the dot to be changed in front of the camera of the operation section 110. It is assumed that gestures corresponding to the dots d1 to d4 are set one on one in advance.

The camera of the operation section 110 generates first captured gesture image data showing gesture corresponding to the dot to be changed by capturing an image of the gesture.

The user subsequently selects any of the upward, downward, rightward, and leftward directions as the direction in which the dot is changed. The user subsequently makes a gesture corresponding to the direction in which the dot is changed in front of the camera of the operation section 110. It is assumed that gestures corresponding to the upward, downward, rightward, and leftward directions are set one on one in advance. One gesture corresponding to the direction in which the dot is changed means a movement distance corresponding to a default number of pixels of the liquid crystal light valve 142. The default number of pixels is, for example, five pixels. The default number is not limited to five and may instead be greater than or equal to six or smaller than five.

The camera of the operation section 110 generates second captured gesture image data showing the gesture by capturing an image of the gesture corresponding to the direction in which the dot is changed.

The gesture recognition section identifies, based on the first captured gesture image data, the dot to be changed corresponding to the gesture indicated by the first captured gesture image data. The gesture recognition section identifies, based on the second captured gesture image data, the direction in which the dot is changed and the distance by which the dot is moved corresponding to the gesture indicated by the second captured gesture image data.

The change instruction e1 to move the position of the dot to be changed in the direction in which the dot is changed by the number of pixels according to the number of gestures corresponding to the direction in which the dot is changed is inputted in the form of gesture made by the user to the operation section 110. The operation section 110 provides the processing section 130 with the change instruction e1. The receipt section 132 receives the change instruction e1 from the operation section 110.

According to the first variation, the receipt section 132 can receive a variety of change instructions e1.

B2: Second Variation

In the first embodiment and the first variation, the change instruction e1 may instead be an instruction to select one candidate image as the second projection image c2 from a plurality of candidate images showing the dots d1 to d4 having a positional relationship different from the positional relationship of the dots d1 to d4 in the first projection image c1.

The number of dots in the first projection image c1 only needs to be four or more, and the number of dots shown in each of the plurality of candidate images is equal to the number of dots in the first projection image c1.

In the second variation, the change instruction e1 to select one candidate image as the second projection image c2 is inputted to a component of the operation section 110, such as the operation buttons, the touch panel, the microphone, or the camera. The operation section 110 provides the processing section 130 with the change instruction e1. The receipt section 132 receives the change instruction e1 from the operation section 110.

When the receipt section 132 receives an input instruction to select one candidate image as the second projection image c2, the projection control section 131 provides the projection section 140 with image data representing the one candidate image selected as the second projection image c2 as the image data a2 representing the second projection image c2.

When the image data representing the one candidate image selected as the second projection image c2 is stored in the storage section 120, the projection control section 131 reads the image data from the storage section 120. The projection control section 131 provides the projection section 140 with the image data read from the storage section 120. The projection control section 131 may generate based on the program P the image data representing the one candidate image selected as the second projection image c2. In this case, the projection control section 131 provides the projection section 140 with the generated image data.

According to the second variation, the user can change the first projection image c1 to the second projection image c2 without selecting a dot and moving the dot. The operational burden on the user can thus be reduced.

B3: Third Variation

In the first embodiment and the first variation, the determination system 1 may prompt the user to check that the dots d1 to d4 are projected on the same surface.

For example, the projection control section 131 superimposes as an OSD (on screen display) image a guide image that prompts the user to check that the dots d1 to d4 are projected on the same surface on the first projection image c1. The guide image is, for example, a displayed message stating "Change the positions of the dots in such a way that the dots are located on the same surface". The guide image is not limited to the displayed message described above and can be changed as appropriate. The guide image is an example of an image that prompts the user to check that at least four feature points are projected on the same surface.

Figure 11:
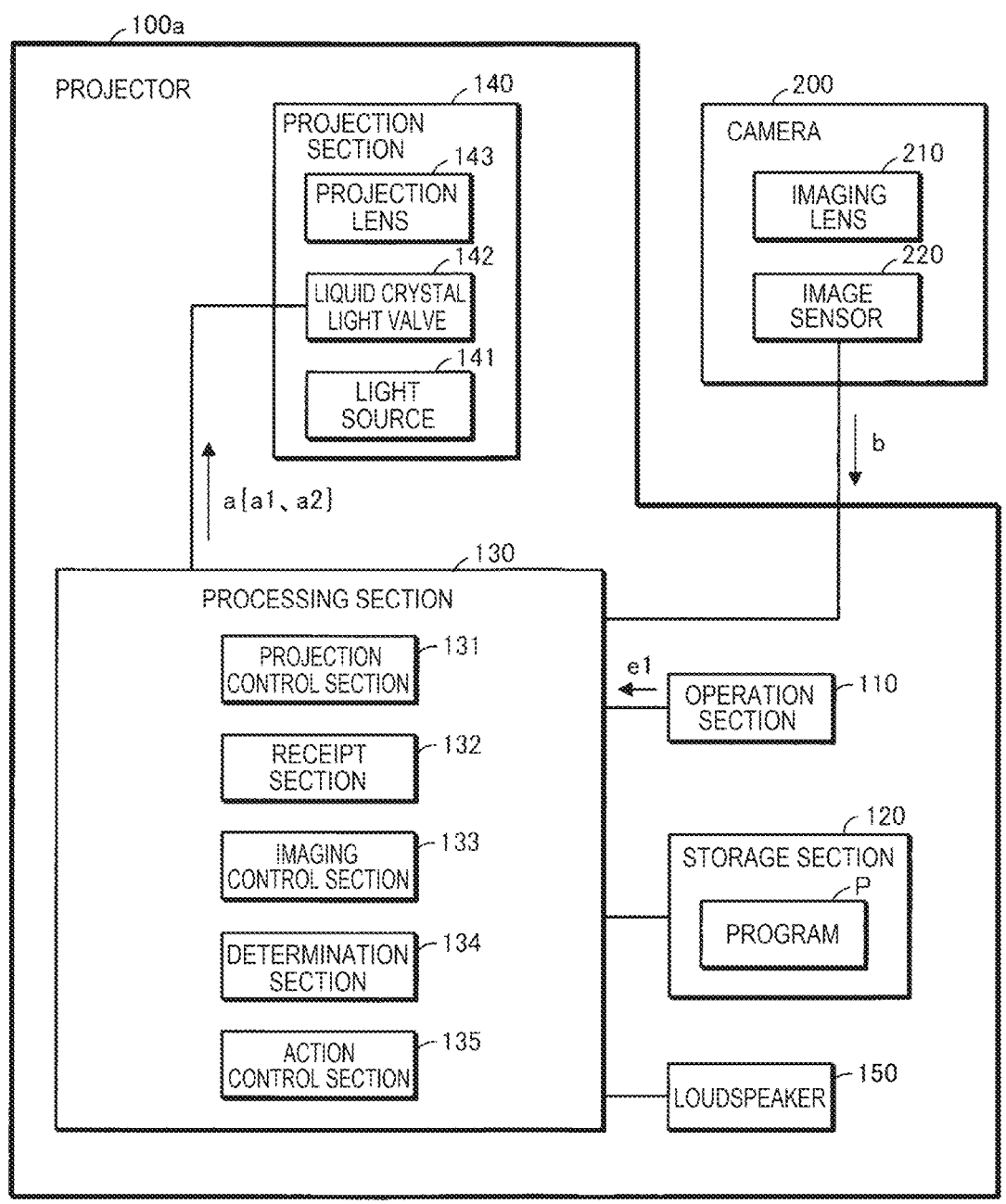
FIG. 11 shows the projector according to a third variation.

When a projector 100a includes a loudspeaker 150 as shown in FIG. 11, the action control section 135 may cause the loudspeaker 150 to output a voice guide that prompts the user to check that the dots d1 to d4 are projected on the same surface in the situation in which the first projection image c1 is projected. The voice guide is, for example, a voice message stating "Change the positions of the dots in such a way that the dots are located on the same surface". The voice guide is not limited to the voice message described above and can be changed as appropriate. The voice guide is an example of a voice message that prompts the user to check that at least four feature points are projected on the same surface.

The third variation allows the user to readily check that the dots d1 to d4 are projected on the same surface.

B4: Fourth Variation

Figure 12:
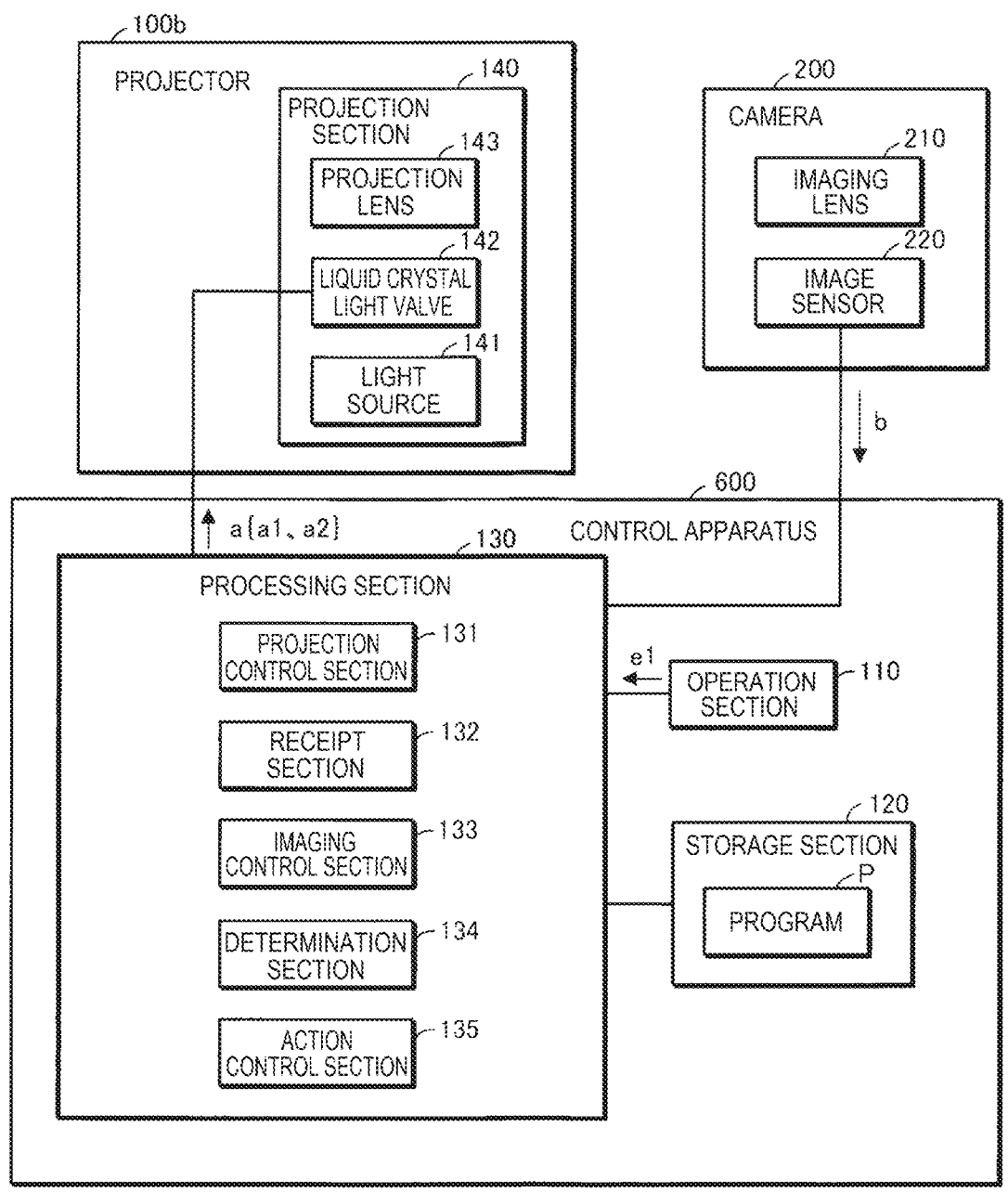
FIG. 12 shows the determination system according to a fourth variation.

In the first embodiment and the first to third variations, the determination system 1 may include a projector 100b, the camera 200, and a control apparatus 600, as shown in FIG. 12.

The projector 100b includes the projection section 140 but does not include the operation section 110, the storage section 120, or the processing section 130. The control apparatus 600 is, for example, a personal computer (PC), a tablet, or a smartphone. The control apparatus 600 includes the operation section 110, the storage section 120, and the processing section 130. The camera 200 may be an object separate from both the projector 100b and the control apparatus 600 or may be incorporated in one of the projector 100b and the control apparatus 600. The control apparatus 600, which provides the projector 100b with the image data a, can also be referred to as an image supply apparatus.

According to the fourth variation, the processing load on the projector can be reduced as compared with the first embodiment and the first to third variations.

B5: Fifth Variation

In the first embodiment and the first to fourth variations, the liquid crystal light valve 142 is used as an example of the light modulator, and the light modulator is not limited to a liquid crystal light valve and can be changed as appropriate. For example, the light modulator may be configured to use one digital mirror device or may be configured based on another scheme. In place of a liquid crystal panel or a DMD, a configuration capable of modulating the light outputted from the light source 141 is employable as the light modulator.

What is claimed is:

1. A projective transformation matrix determination method comprising:
   receiving a change instruction to change a positional relationship among four feature points in a situation in which a projector projects a first projection image showing the four feature points onto a first area;
   causing the projector to project a second projection image showing the four feature points onto the first area in response to the change instruction, the positional relationship among the four feature points in the second projection image differs from the positional relationship among the four feature points in the first projection image; and
   determining a projective transformation matrix based on coordinates of the four feature points in the second projection image and coordinates of the four feature points in a first captured image generated by capturing, with a camera, an image of the first area where the second projection image is projected, the projective transformation matrix associating a projector coordinate system which defining coordinates in a projection image projected by the projector with a camera coordinate system defining coordinates in a captured image generated by the camera.

2. The projective transformation matrix determination method according to claim 1,
wherein the change instruction is an instruction to change a position of one of the four feature points in the first projection image.

3. The projective transformation matrix determination method according to claim 2, further comprising:
accepting the change instruction to change the positional relationship among the four feature points in the first projection image from a first positional relationship to a second positional relationship; and
setting the positional relationship among the four feature points in the second projection image to be the second positional relationship.

4. The projective transformation matrix determination method according to claim 1,
wherein the change instruction indicates an instruction to select one candidate image as the second projection image from a plurality of candidate images showing the four feature points having a positional relationship different from the positional relationship among the four feature points in the first projection image.

5. The projective transformation matrix determination method according to claim 1,
wherein the change instruction is received a user inputs instructions.

6. The projective transformation matrix determination method according to claim 1, further comprising
prompting a user to check that the four feature points are projected on a single planar surface.

7. The projective transformation matrix determination method according to claim 6,
wherein the first projection image further shows an image that prompts the user to check that the four feature points are projected on the single planar surface.

8. The projective transformation matrix determination method according to claim 6,
wherein voice prompts the user to check that the four feature points are projected on the single planar surface.

9. A projector comprising:
a projection lens that projects an image;
at least one processor executes:
receiving a change instruction to change a positional relationship among four feature points in a situation in which the projection lens projects a first projection image showing the four feature points onto a first area;
projecting a second projection image via the projection lens showing the four feature points onto the first area in response to the change instruction, the positional relationship among the four feature points in the second projection image differs from the positional relationship among the four feature points in the first projection image; and
determining a projective transformation matrix based on coordinates of the four feature points in the second projection image and coordinates of the four feature points in a first captured image generated by capturing, with a camera, an image of the first area where the second projection image is projected, the projective transformation matrix associating a projection coordinate system which defining coordinates in a projection image projected by the projection lens with a camera coordinate system defining coordinates in a captured image generated by the camera.

10. A determination system comprising:
a projector that projects an image;
a camera that performs imaging; and
a control apparatus comprising any of a computer, a tablet or a smartphone executes:
receiving a change instruction to change a positional relationship among four feature points in a situation in which the projector projects a first projection image showing the four feature points onto a first area;
causing the projector to project a second projection image showing the four feature points onto the first area in response to the change instruction, the positional relationship among the four feature points in the second projection image differs from the positional relationship among the four feature points in the first projection image; and
determining a projective transformation matrix based on coordinates of the four feature points in the second projection image and coordinates of the four feature points in a first captured image generated by capturing, with the camera, an image of the first area where the second projection image is projected, the projective transformation matrix associating a projector coordinate system which defining coordinates in a projection image projected by the projector with a camera coordinate system defining coordinates in a captured image generated by the camera.

\* \* \* \* \*